(12) United States Patent
Chung et al.

(10) Patent No.: US 10,760,894 B2
(45) Date of Patent: Sep. 1, 2020

(54) OPTICAL DETECTING DEVICE CAPABLE OF DETERMINING RELATIVE POSITION OF A REFERENCE OBJECT OR A LIGHT SOURCE

(71) Applicant: PixArt Imaging Inc., Hsin-Chu (TW)

(72) Inventors: Ching-Lin Chung, Hsin-Chu (TW); Tien-Li Lin, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 476 days.

(21) Appl. No.: 15/465,612

(22) Filed: Mar. 22, 2017

(65) Prior Publication Data

US 2018/0051979 A1 Feb. 22, 2018

(30) Foreign Application Priority Data

Aug. 16, 2016 (TW) ............................... 105126056 A

(51) Int. Cl.
  *G01C 21/02* (2006.01)
  *G01B 11/00* (2006.01)
  *G01S 17/46* (2006.01)
  *G01S 17/89* (2020.01)

(52) U.S. Cl.
  CPC ............ *G01B 11/002* (2013.01); *G01S 17/46* (2013.01); *G01S 17/89* (2013.01)

(58) Field of Classification Search
  CPC ........ G01B 11/002; G01S 17/46; G01S 17/89
  USPC ............................ 250/206.1, 559.38, 559.39
  See application file for complete search history.

(56) References Cited

U.S. PATENT DOCUMENTS

| | | | | | |
|---|---|---|---|---|---|
| 3,794,426 | A | * | 2/1974 | Mueller | G02B 5/32 356/300 |
| 4,585,349 | A | * | 4/1986 | Gross | G01B 11/00 356/624 |
| 6,509,958 | B2 | * | 1/2003 | Pierenkemper | G01S 7/4817 356/4.01 |
| 7,009,713 | B2 | * | 3/2006 | Seko | G06K 9/224 356/498 |
| 7,800,758 | B1 | * | 9/2010 | Bridges | G01B 11/002 356/482 |
| 8,681,247 | B1 | * | 3/2014 | Pieper | G01J 3/28 250/458.1 |
| 2013/0155225 | A1 | * | 6/2013 | Kumagai | G01C 15/002 348/137 |

\* cited by examiner

*Primary Examiner* — Georgia Y Epps
(74) *Attorney, Agent, or Firm* — Winston Hsu

(57) ABSTRACT

An optical detecting device is utilized to determine a relative position of a reference object or a light source according to an optical reflecting signal reflected from the reference object via an optical detecting signal emitted by the light source. The optical detecting device includes a light penetrating component, at least one light tight structure and an optical detecting component. A focal length of the light penetrating component is greater than a predetermined distance. The light tight structure is located on a region correlative to the light penetrating component. The optical detecting component is disposed by the light penetrating component and spaced from the light penetrating component by the predetermined distance. The optical reflecting signal is projected onto the optical detecting component through the light penetrating component to form a characteristic image via the light tight structure, and the characteristic image can be used to determine the relative position.

17 Claims, 4 Drawing Sheets

OPTICAL DETECTING DEVICE CAPABLE OF DETERMINING RELATIVE POSITION OF A REFERENCE OBJECT OR A LIGHT SOURCE

BACKGROUND OF THE INVENTION

1. Field of the Invention

The present invention relates to an optical detecting device, and more particularly, to an optical detecting device capable of determining a relative position of a reference object or a light source.

2. Description of the Prior Art

A conventional optical distance measuring device includes a light emitting unit, an optical lens and an optical detecting component. The light emitting unit emits the detecting beam to project onto an external tested object, the reflecting beam is generated from the tested object by reflection and projected onto the optical detecting component through the optical lens, and the optical detecting component analyzes parameter variation of the reflecting beam to determine relative distance of the tested object. Function of the optical lens is focusing the reflecting beam and transmitting the focused reflecting beam into the optical detecting component, and the conventional optical distance measuring device cannot have artistic thin-typed appearance because structural dimensions of the optical distance measuring device is constrained by a focal length of the optical lens. In addition, the conventional optical distance measuring device utilizes the optical lens to focus the reflecting beam on the optical detecting component, and detection precision of the optical detecting component is decreased while a testing interval between the optical distance measuring device and the tested object is short, so that the conventional optical distance measuring device has drawbacks of appearance design and operating function.

SUMMARY OF THE INVENTION

The present invention provides an optical detecting device capable of determining a relative position of a reference object or a light source for solving above drawbacks.

According to the claimed invention, an optical detecting device capable of determining a relative position of a reference object or a light source according to an optical reflecting signal generated from the reference object is disclosed, and the reference object reflects an optical detecting signal emitted by the light source to generate the optical reflecting signal. The optical detecting device includes a light penetrating component, at least one light tight structure and an optical detecting component. A focal length of the light penetrating component is greater than a predetermined distance. The light tight structure is located on a region correlative to the light penetrating component. The optical detecting component is disposed by the light penetrating component and spaced from the light penetrating component in the predetermined distance. The optical reflecting signal is projected onto a detective surface of the optical detecting component through the light penetrating component at a projecting direction, apart of the optical reflecting signal blocked by the light tight structure is applied to form a characteristic image on the detective surface, and the optical detecting component determines the relative position of the reference object or the light source according to a parameter of the characteristic image. The projecting direction is not parallel to a normal vector of the detective surface.

According to the claimed invention, a dimension of the light penetrating component is greater than a dimension of the light tight structure, and the light tight structure is fixed onto a specific region of the light penetrating component. An angle between a planar normal vector of the light penetrating component and the normal vector of the detective surface is a constant value. The light tight structure is formed on at least one lateral surface of the light penetrating component in a coating manner, in an adhesion manner, or in a wedging manner. The light tight structure is an independent unit detachably disposed on the light penetrating component. The optical detecting device further includes a light isolating component disposed adjacent by the light penetrating component and the optical detecting component, and adapted to prevent the optical detecting signal and/or the optical reflecting signal from being projected onto the detective surface while not passing through the light penetrating component. The optical detecting component utilizes a built-in processing unit to calculate the relative position of the reference object or the light source, or transmits related information to an external processor for calculating the relative position.

According to the claimed invention, the light source is a light emitting unit disposed adjacent by the optical detecting component, the optical detecting component utilizes shift variation of the characteristic image to acquire a distance of the reference object relative to the optical detecting component. The optical detecting component utilizes intensity variation of the characteristic image to acquire an inclined angle of a planar normal vector of the reference object relative to the normal vector of the detective surface. An interval and a light emitting direction of the light emitting unit relative to the optical detecting component are constant values.

According to the claimed invention, the optical detecting signal is generated by an external light source, a distance of the reference object relative to the light tight structure is a known value, the optical detecting component acquires a distance and a direction of the external light source relative to the optical detecting device according to parameter variation of the characteristic image. The parameter is a gravity center position, a boundary value and/or a dimension of the characteristic image.

According to the claimed invention, the light tight structure is a solid object, or a non-solid object with a hole structure. The optical reflecting signal passes through the hole structure to form a fringe and/or a projective pattern on the detective surface, the optical detecting component analyzes variation of the fringe and/or the projective pattern to acquire the relative position of the reference object or the light source. The hole structure is a circular aperture or a narrow slit.

According to the claimed invention, the optical detecting device further includes a plurality of light tight structures respectively disposed on different regions of the light penetrating component according to a known distance, or according to the known distance and a known angle. The optical reflecting signal is applied to form a plurality of characteristic images on the detective surface via the plurality of light tight structures, and the optical detecting component determines the relative position of the reference object or the light source according to parameter relation between the plurality of characteristic images.

The present invention is different from conventional technique that utilizes an optical lens to focus the optical signal on the optical detecting component. The optical detecting device of the present invention disposes the small-size light tight structure on the light penetrating component, the optical signal can be projected onto the optical detecting component through the light penetrating component and the light tight structure to form the projective pattern, and the small-size shadow region within the projective pattern is represented as the characteristic image. The detective surface of the optical detecting component may include a plurality of detecting units, and resolution of the optical detecting component can be increased by utilizing the detecting units with small pixel sizes. While a tested object is moved relative to the optical detecting device, the optical detecting device can determine behavior of the tested object (such like the azimuth angle and/or the distance) according to parameter variation of the characteristic image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
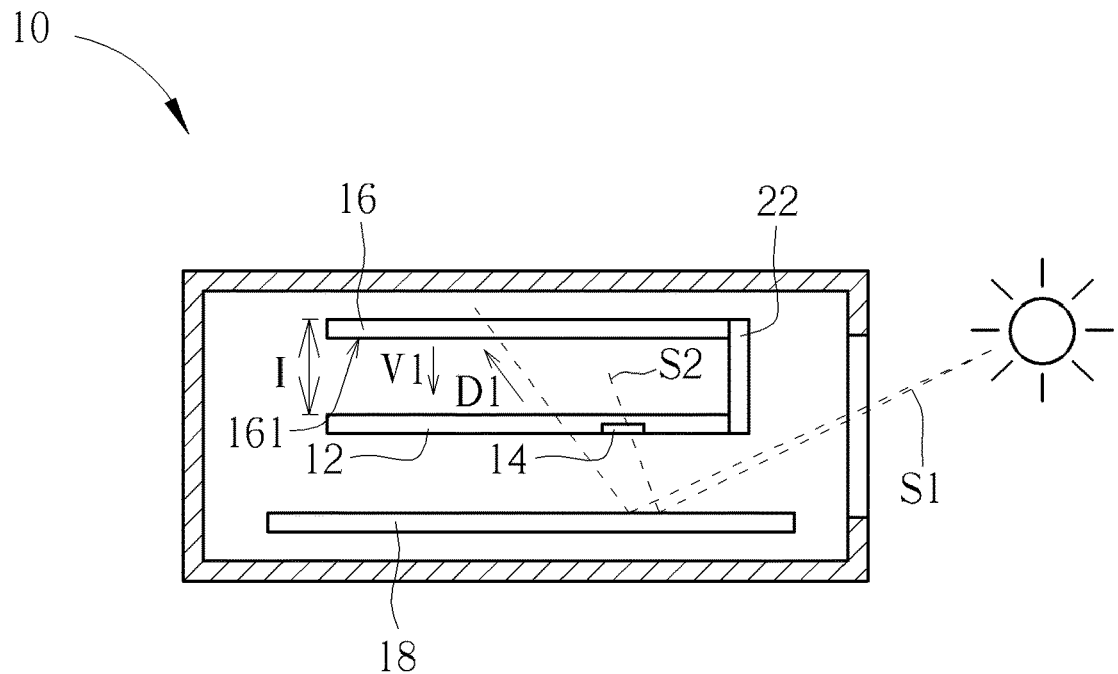
FIG. 1 and FIG. 2 respectively are structural diagrams of an optical detecting device in different operation modes according to a first embodiment of the present invention.
Figure 2:
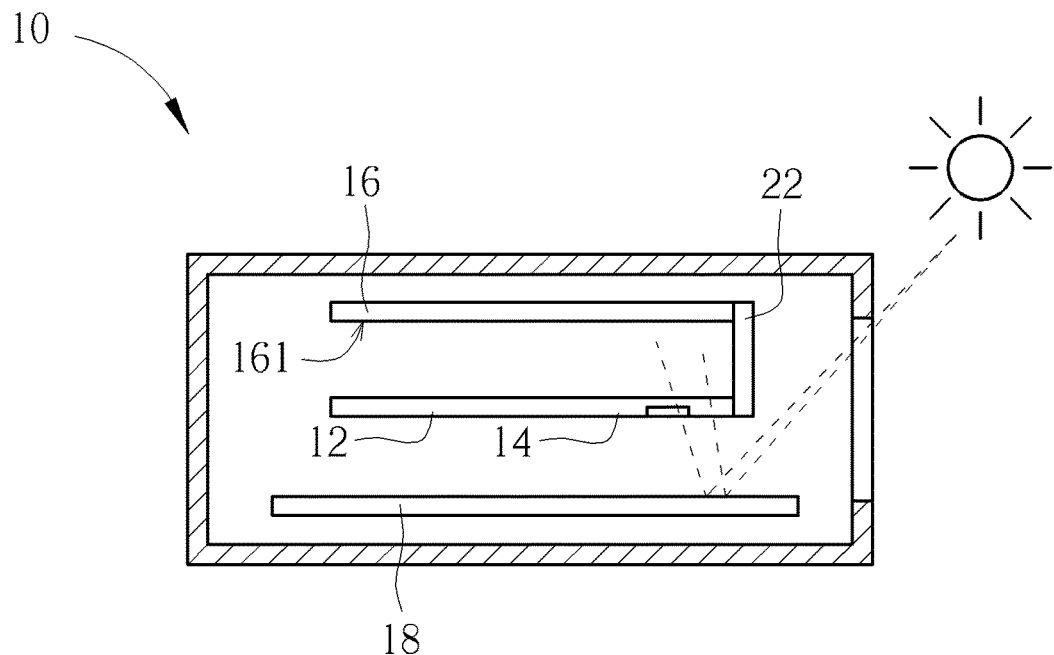

Please refer to FIG. 1 and FIG. 2. FIG. 1 and FIG. 2 respectively are structural diagrams of an optical detecting device 10 indifferent operation modes according to a first embodiment of the present invention. The optical detecting device 10 includes a light penetrating component 12, a light tight structure 14, an optical detecting component 16 and a reference object 18. The light tight structure 14 is located on a region correlative to the light penetrating component 12. The light tight structure 14 can be a part of the light penetrating component 12 formed by front manufacture procedure, or an independent unit detachably disposed on the light penetrating component 12 during rear manufacture procedure; assembly of the light penetrating component 12 and the light tight structure 14 is not limited to the above-mentioned embodiment, which depends on design demand. The light penetrating component 12 is located between the optical detecting component 16 and the reference object 18. The optical detecting component 16 is disposed adjacent by the light penetrating component 12, and an interval between the optical detecting component 16 and the light penetrating component 12 is equal to a predetermined distance I. A focal length of the light penetrating component 12 is greater than the predetermined distance I, which means the light penetrating component 12 can be an optical lens or a planar transparent glass having the focal length greater than the predetermined distance I.

As the embodiment shown in FIG. 1 and FIG. 2, the light tight structure 14 is directly formed on a partial region on a surface of the light penetrating component 12, which represents the light tight structure 14 is monolithically integrated with the light penetrating component 12. The light tight structure 14 further can be separated from the light penetrating component 12 and formed on another unit; for example, the light tight structure 14 can be optionally located between the light penetrating component 12 and the optical detecting component 16, or located on a side of the light penetrating component 12 opposite to the optical detecting component 16. Any optical detecting device having the light penetrating component 12 spaced from the light tight structure 14 in the predetermined distance to allow the optical detecting component 16 for accurately determining shadow variation formed by the optical signal through the light tight structure 14 belongs to a scope of the present invention.

A dimension of the light penetrating component 12 is greater than a dimension of the light tight structure 14. While the optical signal passes through the light penetrating component 12 to be received by the optical detecting component 16, a part of the optical signal is blocked by the light tight structure 14 to form a small shadow on a detective surface 161 of the optical detecting component 16. The light tight structure 14 is fixed onto a specific region of the light penetrating component 12; for example, the light tight structure 14 can be disposed on at least one lateral surface of the light penetrating component 12 in a coating manner, in an adhesion manner, or in a wedging manner. An angle between a planar normal vector of the light penetrating component 12 (and the light tight structure 14 set on the light penetrating component 12) and a normal vector D2 of the detective surface 161 is a constant value. Dimensions and an azimuth angle of the light tight structure 14 are known information, and the optical detecting component 16 can utilize a built-in processing unit to analyze a characteristic image formed by the said shadow or transmit related information of the characteristic image to an external processor for calculation, so as to determine variation of the optical signal accordingly.

In the first embodiment, the reference object 18 is fixed inside a casing of the optical detecting device 10, which means a distance of the reference object 18 spaced from the light penetrating component 12 and the light tight structure 14 is a known constant value. An optical detecting signal S1 emitted by the external light source 20 can be transformed into an optical reflecting signal S2 by reflection of the reference object 18, the optical reflecting signal S2 passes through the light penetrating component 12 and is projected onto the detective surface 161 of the optical detecting component 16. The light tight structure 14 is located on a transmission path of the optical reflecting signal S2. The optical reflecting signal S2 is partially blocked by the light tight structure 14 to form the characteristic image (which represents the shadow region) on the detective surface 161. As a movement of the external light source 20, an arrival direction of the optical detecting signal S1 and a reflection direction of the optical reflecting signal S2 can be varied accordingly, position of the characteristic image projected onto the detective surface 161 is shifted, or a shape of the characteristic image may be slightly deformed. The optical detecting component 16 analyzes parameter variation of the characteristic image, and the said parameter can be a gravity center position, a boundary value and/or a dimension of the characteristic image, so as to determine the azimuth angle and distance variation of the external light source 20 relative to the optical detecting device 10.

The optical detecting device 10 further can optionally dispose a light isolating component 22 adjacent by sides of the light penetrating component 12 and the optical detecting component 16, to prevent the optical detecting signal S1 and/or the optical reflecting signal S2 from being directly projected onto the detective surface 161 while the optical detecting signal S1 and/or the optical reflecting signal S2 does not pass through the light penetrating component 12, and to prevent quality of the characteristic image from being damaged by noise interference. In addition, a projecting direction D1 of the optical reflecting signal S2 projected onto the detective surface 161 is not parallel to the normal vector V1 of the detective surface 161, which means the optical detecting signal S1 of the external light source 20 cannot be directly projected onto the optical detecting component 16. The external light source 20 emits the optical detecting signal S1 into a lateral side of the optical detecting device 10, and the optical reflecting signal S2 generated from the reference object 18 can be projected onto the light penetrating component 12 and the light tight structure 14, to form the characteristic image (which contains azimuth information of the external light source 20) on the detective surface 161.

An amount of the light tight structure 14 is not limited to the light tight structure 14 described in the first embodiment. While the optical detecting device 10 includes a plurality of light tight structures 14, the plurality of light tight structures 14 can be respectively disposed on different regions of the light penetrating component 12 according to a known distance (such as the distance between two light tight structures 14), or according to the known distance and a known angle (such as position relation between three or more light tight structures 14). Because the position relation (the distance and the azimuth angle) between the plurality of light tight structures 14 are known values, a plurality of characteristic images formed by the optical reflecting signal S2 projected onto the optical detecting component 16 through the light penetrating component 12 and the light tight structures 14 can be utilized to determine information (such like the distance and the azimuth angle) of the external light source 20 relative to the optical detecting device 10.

Figure 3:
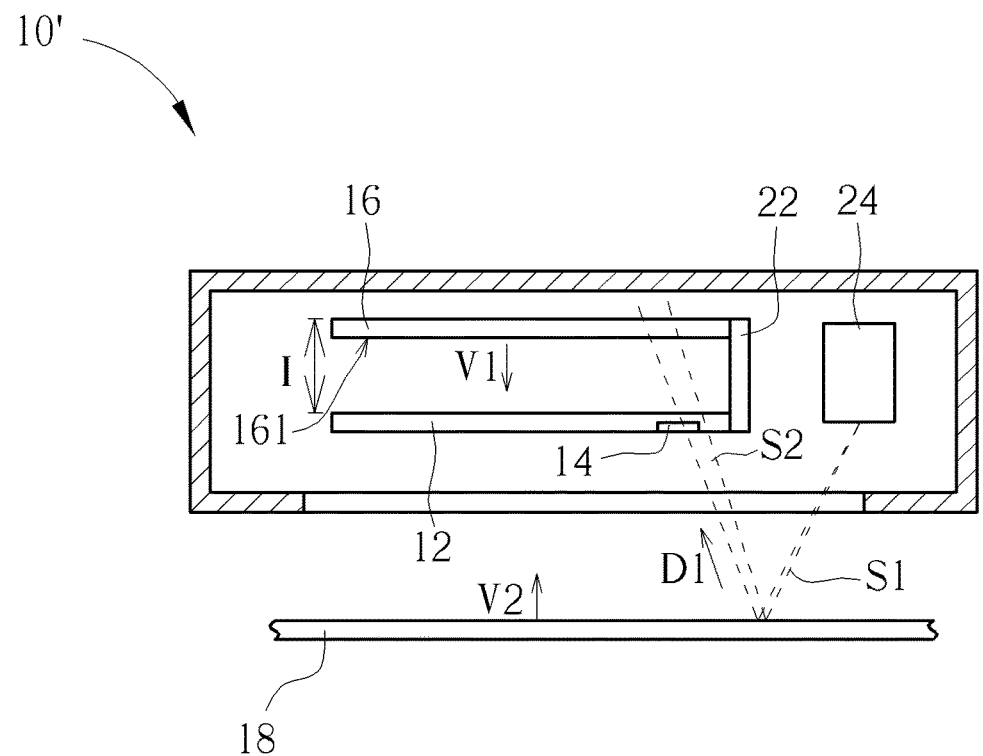
FIG. 3 and FIG. 4 respectively are structural diagrams of an optical detecting device in different operation modes according to a second embodiment of the present invention.
Figure 4:
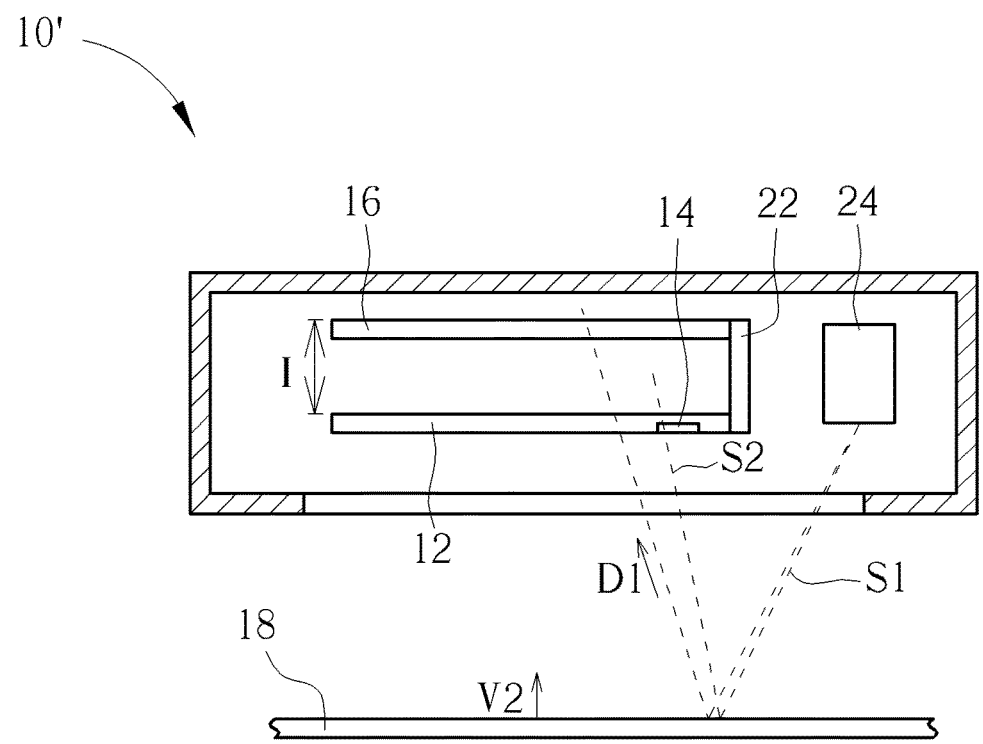

Please refer to FIG. 3 and FIG. 4. FIG. 3 and FIG. 4 respectively are structural diagrams of an optical detecting device 10' in different operation modes according to a second embodiment of the present invention. In the second embodiment, elements having the same numerals as ones of the first embodiment have the same structures and functions, and a detailed description is omitted herein for simplicity. The optical detecting device 10' includes the light penetrating component 12, the light tight structure 14, the optical detecting component 16, the light isolating component 22 and the light emitting unit 24. Difference between the second embodiment and the first embodiment is: the light emitting unit 24 of the second embodiment is fixed inside the optical detecting device 10', and is represented as a predetermined light source located by the optical detecting component 16; which means the interval and light emitting direction of the light emitting unit 24 relative to the optical detecting component 16 are known constant values. The reference object 18 of the second embodiment is not fixed inside the optical detecting device 10', the reference object 18 is represented as an external movable object, and the distance of the reference object 18 relative to the optical detecting device 10' is unknown information for the optical detecting component 16.

The optical detecting signal S1 emitted by the light emitting unit 24 is reflected from the reference object 18 to generate the optical reflecting signal S2, and the optical reflecting signal S2 is projected onto the light penetrating component 12 and the light tight structure 14 to form the characteristic image on the detective surface 161. While a relative movement between the optical detecting device 10' and the reference object 18 is generated, position and dimensions of the characteristic image on the detective surface 161 are varied accordingly. As shown in FIG. 3 and FIG. 4, while the reference object 18 is moved away from the optical detecting device 10', the characteristic image (which represents the shadow region formed by the optical reflecting signal S2 blocked by the light tight structure 14 and projected onto the detective surface 161) is moved toward the light emitting unit 24 and dimensions of the characteristic image is reduced; while the reference object 18 is moved close to the optical detecting device 10', the characteristic image is moved far from the light emitting unit 24 and dimensions of the characteristic image is enlarged, so that the optical detecting component 16 can analyze shift variation of the characteristic image to acquire distance variation between the reference object 18 and the optical detecting device 10'.

Figure 5:
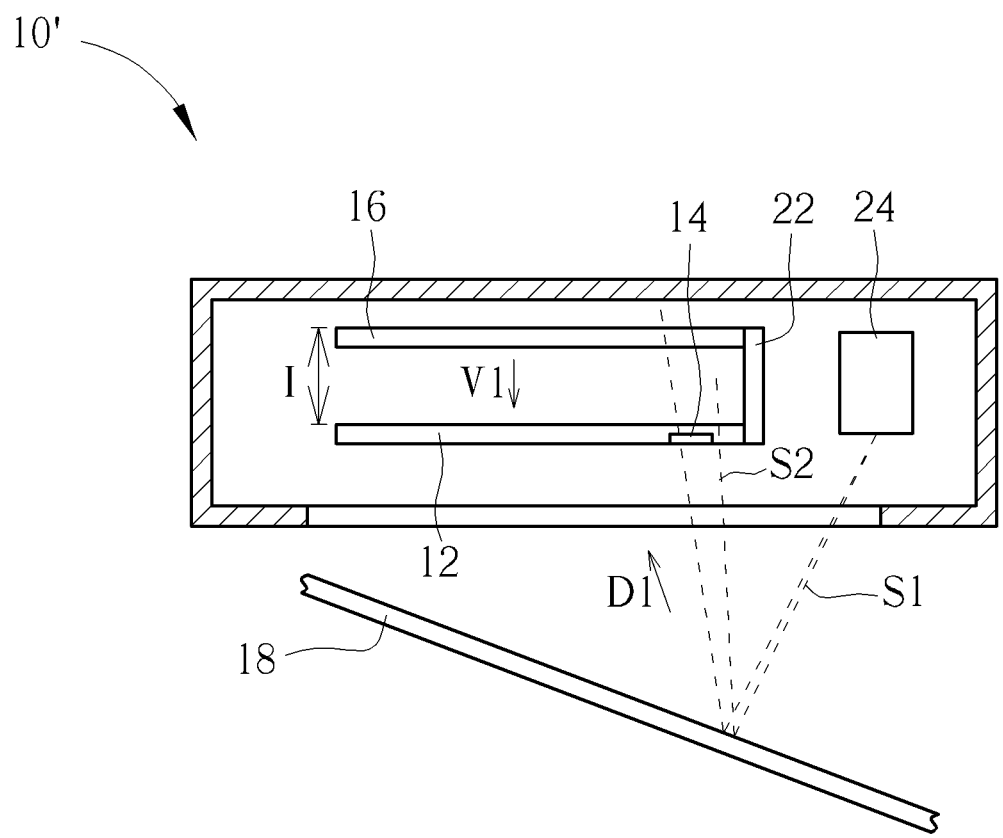
FIG. 5 is a structural diagram of the optical detecting device in another operation mode according to the second embodiment of the present invention.

The second embodiment can dispose the plurality of light tight structures 14 on the light penetrating component 12 with known intervals and known angles, the plurality of characteristic images can be formed via the optical reflecting signal S2 partly blocked by the light tight structures 14, and parameter relation between the plurality of characteristic images can be utilized to determine the relative position of the reference object 18. Please refer to FIG. 3 and FIG. 5. FIG. 5 is a structural diagram of the optical detecting device 10' in another operation mode according to the second embodiment of the present invention. The distance between the reference object 18 and the optical detecting device 10' shown in FIG. 5 is similar to the distance between the reference object 18 and the optical detecting device 10' shown in FIG. 3, however the reference object 18 in FIG. 5 can be rotated at a clockwise direction. As shown in FIG. 3, position of the characteristic image projected onto the optical detecting component 16 is distant from the light emitting unit 24, intensity of the characteristic image is weak (which means the shadow region has high gray level), and a boundary of the characteristic image is blurred. As the reference object 18 is rotated toward the light emitting unit 24 shown in FIG. 5, the boundary of the characteristic image becomes sharp, hues of the characteristic image becomes dark accordingly (which means the shadow region has low gray level), and the optical detecting component 16 can determine an inclined angle between the planar normal vector V2 of the reference object 18 and the normal vector V1 of the detective surface 161 in accordance with intensity variation of the characteristic image.

For example, the optical detecting device 10' can be applied to an optical mouse, and is used to determine a moving track of the optical mouse. Further, while the optical mouse is inversely put on a supporting surface (which means the detective surface 161 faces air upwardly instead of facing the supporting surface), the optical detecting signal S1 emitted by the light emitting unit 24 cannot be reflected by the reference object (such as the supporting surface), a transmission direction of surrounding light projected onto the optical detecting component 16 is almost parallel to the normal vector V1 of the detective surface 161, dimensions of the characteristic image is smallest, and position of the characteristic image projected onto the detective surface 161 is limited within a specific region, so that the optical detecting device 10' can determine the optical mouse is incorrectly placed, so as to generate a warning for reminding the user accordingly or temporarily shut down navigation function of the optical mouse.

Figure 6:
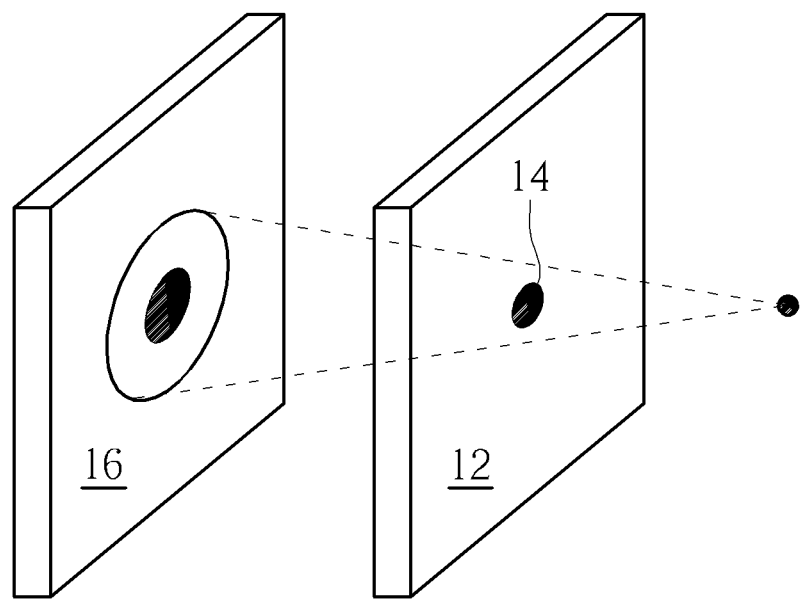
FIG. 6 is another view of the light penetrating component, the light tight structure and the optical detecting component shown in FIG. 1 to FIG. 5.

Please refer to FIG. 6. FIG. 6 is another view of the light penetrating component 12, the light tight structure 14 and the optical detecting component 16 shown in FIG. 1 to FIG. 5. The light tight structure 14 in the first embodiment and the second embodiment can be a solid object, and the optical signal is projected onto the optical detecting component 16 through the light penetrating component 12 and the light tight structure 14 to form the characteristic image (which means the foresaid shadow region). The position, the dimensions, the shape and the intensity of the characteristic image projected onto the detective surface 161 of the optical detecting component 16 are varied for determining relative shift and angle variation of the reference object 18 or the external light source 20 while the azimuth angle of the external light source 20 relative to the optical detecting device 10 in the first embodiment is changed, or while the interval of the reference object 18 relative to the optical detecting device 10 in the second embodiment is changed, or while the inclined angle of the reference object 18 relative to the optical detecting device 10 in the second embodiment is changed.

Figure 7:
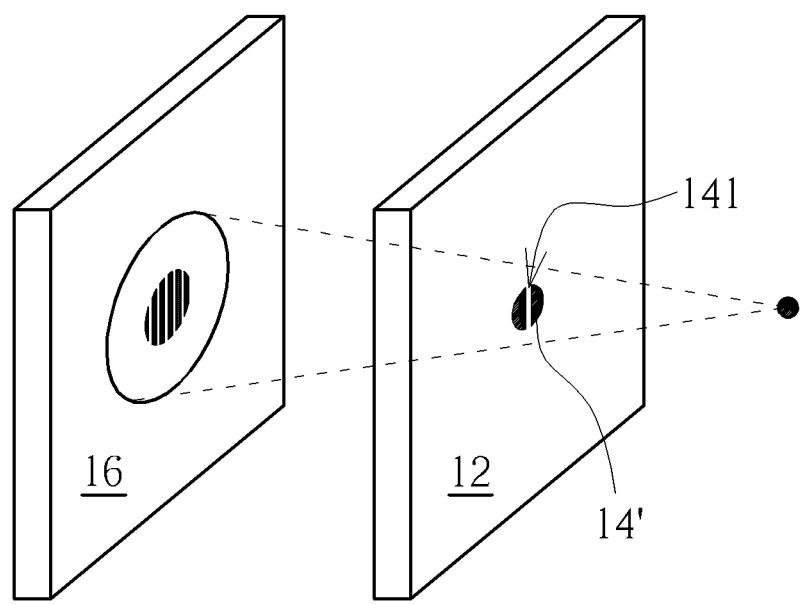
FIG. 7 is a diagram of the light tight structure according to another embodiment of the present invention.

Please refer to FIG. 1 to FIG. 4 and FIG. 7. FIG. 7 is a diagram of the light tight structure 14' according to another embodiment of the present invention. The light tight structure 14' can be designed as a non-solid object with a hole structure 141, and the hole structure 141 is a microstructure similar to a circular aperture or a narrow slit capable of forming a fringe. While the optical reflecting signal is projected onto the optical detecting component 16 though the light penetrating component 12 and the light tight structure 14' to form the characteristic image, the fringe is generated on the detective surface 161 by the hole structure 141 on the light tight structure 14'. While the azimuth angle of the external light source 20 relative to the optical detecting device 10 is changed, or the distance and/or the inclined angle of the reference object 18 relative to the optical detecting device 10 is changed, phase of the fringe is modulated accordingly, the optical detecting component 16 can calculate the relative position of the external light source 20 in the first embodiment, or the relative position of the reference object 18 in the second embodiment, in accordance with phase difference of the fringe. It should be mentioned that range-finding function of the fringe can be cooperated with analysis of the characteristic image for increasing calculation precision of the relative position about the reference object 18 or the external light source 20.

In conclusion, the present invention is different from conventional technique that utilizes an optical lens to focus the optical signal on the optical detecting component. The optical detecting device of the present invention disposes the small-size light tight structure on the light penetrating component, the optical signal can be projected onto the optical detecting component through the light penetrating component and the light tight structure to form the projective pattern, and the small-size shadow region within the projective pattern is represented as the characteristic image. The detective surface of the optical detecting component may include a plurality of detecting units, and resolution of the optical detecting component can be increased by utilizing the detecting units with small pixel sizes. While a tested object is moved relative to the optical detecting device, the optical detecting device can determine behavior of the tested object (such like the azimuth angle and/or the distance) according to parameter variation of the characteristic image. In the first embodiment, the optical detecting device can be applied to a solar panel, and the optical detecting device can detect the azimuth angle of the external light source (the sun) and drive rotation of the solar panel to face the sun for preferred power generation efficiency. In the second embodiment, the optical detecting device can provide a short-range measuring function applied to the optical mouse or any portable electronic apparatus, the optical detecting device utilizes the shadow region formed by the light tight structure (instead of utilizing focus of the optical lens) to determine the distance of the tested object, and to accurately calculate the relative position of the tested object regardless of the interval between the reference object (which means the tested object) and the optical detecting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting device capable of determining a relative position of a reference object or a light source according to an optical reflecting signal generated from the reference object, the reference object reflecting an optical detecting signal emitted by the light source to generate the optical reflecting signal, the optical detecting device comprising:
    a light penetrating component, a focal length of the light penetrating component being greater than a predetermined distance;
    at least one light tight structure located on a region correlative to the light penetrating component; and
    an optical detecting component disposed by the light penetrating component and spaced from the light penetrating component in the predetermined distance, the optical reflecting signal being projected onto a detective surface of the optical detecting component through the light penetrating component at a projecting direction, a part of the optical reflecting signal blocked by the light tight structure being applied to form a characteristic image on the detective surface, and the optical detecting component determining the relative position of the reference object or the light source according to a parameter of the characteristic image, wherein the projecting direction is not parallel to a normal vector of the detective surface.

2. The optical detecting device of claim 1, wherein a dimension of the light penetrating component is greater than a dimension of the light tight structure, and the light tight structure is fixed onto a specific region of the light penetrating component.

3. The optical detecting device of claim 1, wherein an angle between a planar normal vector of the light penetrating component and the normal vector of the detective surface is a constant value.

4. The optical detecting device of claim 1, wherein the light tight structure is formed on at least one lateral surface of the light penetrating component in a coating manner, in an adhesion manner, or in a wedging manner.

5. The optical detecting device of claim 1, wherein the light tight structure is an independent unit detachably disposed on the light penetrating component.

6. The optical detecting device of claim 1, further comprising:

a light isolating component disposed adjacent by the light penetrating component and the optical detecting component, and adapted to prevent the optical detecting signal and/or the optical reflecting signal from being projected onto the detective surface while not passing through the light penetrating component.

7. The optical detecting device of claim 1, wherein the optical detecting component utilizes a built-in processing unit to calculate the relative position of the reference object or the light source, or transmits related information to an external processor for calculating the relative position.

8. The optical detecting device of claim 1, wherein the light source is a light emitting unit disposed adjacent by the optical detecting component, the optical detecting component utilizes shift variation of the characteristic image to acquire a distance of the reference object relative to the optical detecting component.

9. The optical detecting device of claim 8, wherein the optical detecting component utilizes intensity variation of the characteristic image to acquire an inclined angle of a planar normal vector of the reference object relative to the normal vector of the detective surface.

10. The optical detecting device of claim 8, wherein an interval and a light emitting direction of the light emitting unit relative to the optical detecting component are constant values.

11. The optical detecting device of claim 1, wherein the optical detecting signal is generated by an external light source, a distance of the reference object relative to the light tight structure is a known value, the optical detecting component acquires a distance and a direction of the external light source relative to the optical detecting device according to parameter variation of the characteristic image.

12. The optical detecting device of claim 1, wherein the parameter is a gravity center position, a boundary value and/or a dimension of the characteristic image.

13. The optical detecting device of claim 1, wherein the light tight structure is a solid object, or a non-solid object with a hole structure.

14. The optical detecting device of claim 13, wherein the optical reflecting signal passes through the hole structure to form a fringe and/or a projective pattern on the detective surface, the optical detecting component analyzes variation of the fringe and/or the projective pattern to acquire the relative position of the reference object or the light source.

15. The optical detecting device of claim 13, wherein the hole structure is a circular aperture or a narrow slit.

16. The optical detecting device of claim 1, wherein the optical detecting device further comprises a plurality of light tight structures respectively disposed on different regions of the light penetrating component according to a known distance, or according to the known distance and a known angle.

17. The optical detecting device of claim 16, wherein the optical reflecting signal is applied to form a plurality of characteristic images on the detective surface via the plurality of light tight structures, the optical detecting component determines the relative position of the reference object or the light source according to parameter relation between the plurality of characteristic images.

* * * * *